United States Patent
Kim et al.

(10) Patent No.: US 10,707,506 B2
(45) Date of Patent: Jul. 7, 2020

(54) HYDROGEN SUPPLY METHOD FOR FUEL CELL SYSTEM

(71) Applicants: HYUNDAI MOTOR COMPANY, Seoul (KR); KIA MOTORS CORPORATION, Seoul (KR)

(72) Inventors: Dae Jong Kim, Yongin-si (KR); Deuk Kuen Ahn, Ansan-si (KR); Hyun Jae Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 357 days.

(21) Appl. No.: 15/813,639

(22) Filed: Nov. 15, 2017

(65) Prior Publication Data
US 2019/0006688 A1 Jan. 3, 2019

(30) Foreign Application Priority Data
Jul. 3, 2017 (KR) .......................... 10-2017-0084349

(51) Int. Cl.
*H01M 8/1018* (2016.01)
*H01M 8/0438* (2016.01)
(Continued)

(52) U.S. Cl.
CPC ....... *H01M 8/04432* (2013.01); *H01M 8/045* (2013.01); *H01M 8/04201* (2013.01);
(Continued)

(58) Field of Classification Search
CPC .............................................. H01M 8/04432
See application file for complete search history.

(56) References Cited

U.S. PATENT DOCUMENTS 7,943,265 B2    5/2011   Katano
7,981,559 B2    7/2011   Yoshida
(Continued)

FOREIGN PATENT DOCUMENTS

| JP | 5113634 B2 | 1/2013 |
|---|---|---|
| KR | 10-2005-0010955 A | 1/2005 |
| KR | 10-2006-0123776 A | 12/2006 |
| KR | 10-2009-0058837 A | 6/2009 |
| KR | 10-1459815 B1 | 11/2014 |

(Continued)

OTHER PUBLICATIONS

Non-Final Office Action issued in related U.S. Appl. No. 15/822,867 dated Sep. 6, 2019.

*Primary Examiner* — Brian R Ohara
(74) *Attorney, Agent, or Firm* — Morgan, Lewis & Bockius LLP

(57) ABSTRACT

A hydrogen supply method for a fuel cell system, for supplying hydrogen according to a state of the fuel cell system when the fuel cell system is started, includes steps of (a) measuring a stop time period which elapses until the fuel cell system is started after the fuel cell system is stopped, (b) determining whether a reaction time period consumed to complete a reaction of residual hydrogen and residual oxygen residing in a fuel cell stack since the fuel system is stopped is not more than the stop time period, and (c) when it is determined in the step (b) that the stop time period is less than the reaction time period, closing a purge valve that is able to discharge gases accommodated in an anode from the anode and supplying at the same time hydrogen to the anode such that an internal pressure of the anode becomes a predetermined first target pressure.

13 Claims, 7 Drawing Sheets

(51) Int. Cl.
    *H01M 8/04225*   (2016.01)
    *H01M 8/04302*   (2016.01)
    *H01M 8/04082*   (2016.01)
    *H01M 8/04223*   (2016.01)
    *H01M 8/04313*   (2016.01)
    *H01M 8/0432*    (2016.01)
    *H01M 8/0444*    (2016.01)
    *H01M 8/04492*   (2016.01)
    *H01M 8/04746*   (2016.01)
    *H01M 8/04791*   (2016.01)
    *H01M 8/22*      (2006.01)

(52) U.S. Cl.
    CPC ... *H01M 8/04223* (2013.01); *H01M 8/04225* (2016.02); *H01M 8/04231* (2013.01); *H01M 8/04302* (2016.02); *H01M 8/04313* (2013.01); *H01M 8/04365* (2013.01); *H01M 8/04388* (2013.01); *H01M 8/04447* (2013.01); *H01M 8/04753* (2013.01); *H01M 8/04798* (2013.01); *H01M 8/222* (2013.01); *H01M 2008/1095* (2013.01)

(56) References Cited

U.S. PATENT DOCUMENTS

| | | | |
|---|---|---|---|
| 7,985,507 B2 | 7/2011 | Kamihara | |
| 9,450,258 B2 | 9/2016 | Lee et al. | |
| 2006/0008689 A1* | 1/2006 | Yonekura | H01M 8/04089 429/415 |
| 2006/0051632 A1 | 3/2006 | Kamihara | |
| 2007/0243426 A1* | 10/2007 | Bono | H01M 8/04089 429/444 |
| 2007/0243437 A1 | 10/2007 | Katano | |
| 2008/0220303 A1 | 9/2008 | Yoshida | |
| 2012/0251910 A1* | 10/2012 | Matsumoto | H01M 8/04 429/429 |
| 2013/0137007 A1 | 5/2013 | Lee et al. | |
| 2016/0190620 A1 | 6/2016 | Kwon et al. | |
| 2016/0336607 A1 | 11/2016 | Lee et al. | |

FOREIGN PATENT DOCUMENTS

| | | |
|---|---|---|
| KR | 10-2016-0015503 A | 2/2016 |
| KR | 10-2016-0078590 A | 7/2016 |
| KR | 10-1679970 B1 | 11/2016 |

* cited by examiner

HYDROGEN SUPPLY METHOD FOR FUEL CELL SYSTEM

CROSS-REFERENCE TO RELATED APPLICATION

This application is based on and claims the benefit of priority to Korean Patent Application No. 10-2017-0084349, filed on Jul. 3, 2017, in the Korean Intellectual Property Office, the disclosure of which is incorporated herein in its entirety by reference.

TECHNICAL FIELD

The present disclosure relates to a hydrogen supply method for a fuel cell system, for supplying hydrogen to a fuel cell system.

BACKGROUND

Fuel cells are main power supply source of a fuel cell system, and generate electricity through an oxidation/reduction reaction of hydrogen and oxygen.

Hydrogen of high purity is supplied from a hydrogen storage tank to an anode of a fuel cell stack (hereinafter, referred to as a 'stack'), and air in the atmosphere supplied by an air compressor or other supply devices is introduced into a cathode of the stack.

An oxidation reaction of hydrogen is undergone in the anode to generate hydrogen ions (e.g., protons) and electrons, and the hydrogen ions and electrons generated in this way move to the cathode through a polymer electrolyte membrane and a separator. Further, a reduction reaction, in which the hydrogen ions and electrons moved from the anode and oxygen in the air supplied by an air supply device participate, is undergone in the cathode so that water is produced and electric energy due to flow of the electrons is generated at the same time.

However, the hydrogen passing through the anode is resupplied to the anode along a hydrogen recirculation line, and nitrogen and other gases included in the air passing through the cathode are crossed over through the polymer electrolyte membrane and introduced into the anode through the polymer electrolyte membrane. Accordingly, as an operation time of the fuel cell system increases, a concentration of the hydrogen in the anode gradually decreases.

When the concentration of the hydrogen in the anode is 70% or more, there is no difficulty in maintaining the performance of the fuel cell system at the highest level. However, if the concentration of the hydrogen of the anode decreases to less than 70%, the performance of the fuel cell system deteriorates. In order to solve this problem, existing fuel cell systems perform a hydrogen purging operation of discharging hydrogen passing through the hydrogen recirculation line and other gases to outside of the fuel cell system to adjust the concentration of the hydrogen in the anode.

Further, when the fuel cell system is stopped, the concentration of the hydrogen in the anode changes according to a time period which has elapsed since the fuel cell system was stopped due to a reaction of residual hydrogen and residual oxygen, cross-over of nitrogen and other gases, introduction of exterior air through a valve or other members. However, when the fuel cell system is started, the existing fuel cell systems collectively performs a hydrogen purging operation without considering a change of the concentration of the hydrogen in the anode according to the stop time period. Accordingly, in the existing fuel cell system, a supply pressure of the hydrogen increases as an excessive hydrogen purging operation is performed when the fuel cell system is started, an amount of the hydrogen exhausted to the outside of the fuel cell system increases, and it is therefore difficult to satisfy regulations of the concentration of hydrogen of exhaust gases.

SUMMARY

The present disclosure provides an improved hydrogen supply method for a fuel cell system that may reduce a hydrogen purging operation performed when a fuel cell system is started.

The present disclosure also provides an improved hydrogen supply method for a fuel cell system that may reduce an amount of hydrogen exhausted to outside of the fuel cell system when the fuel cell system is started.

The present disclosure also provides an improved hydrogen supply method for a fuel cell system that may reduce pressure of hydrogen supplied when the fuel cell system is started.

The present disclosure also provides an improved hydrogen supply method for a fuel cell system that may reduce a concentration of hydrogen of exhaust gases discharged when the fuel cell system is started.

The present disclosure also provides an apparatus and a method for controlling autonomous driving of a vehicle, by which an alaLm may be output when a predicted jerk of a driver calculated during driving of a vehicle with reference to an allowable jerk of the driver exceeds the allowable jerk of the driver, and a vehicle system.

The technical objects of the present disclosure are not limited to the above-mentioned one, and the other unmentioned technical objects will become apparent to those skilled in the art from the following description.

In accordance with an aspect of the present disclosure, a hydrogen supply method for a fuel cell system is provided for supplying hydrogen according to a state of the fuel cell system when the fuel cell system is started. The hydrogen supply method includes steps of (a) measuring a stop time period which elapses until the fuel cell system is started after the fuel cell system is stopped, (b) determining whether a reaction time period consumed to complete a reaction of residual hydrogen and residual oxygen residing in a fuel cell stack since the fuel system is stopped is not more than the stop time period, and (c) when it is determined in the step (b) that the stop time period is less than the reaction time period, closing a purge valve that is able to discharge gases accommodated in an anode from the anode and supplying at the same time hydrogen to the anode such that an internal pressure of the anode becomes a predetermined first target pressure.

The predetermined first target pressure may be set such that a concentration of the hydrogen in the anode becomes a predetermined first target concentration.

The hydrogen supply method may further include a step of (d) before the step (b), measuring the internal pressure of the anode.

The hydrogen supply method may further include steps of (e) determining whether the internal pressure of the anode measured in the step (d) is less than a predetermined abnormal pressure, and (f) when it is determined in the step (e) that the internal pressure is not less than the predetermined abnormal pressure, opening the purge valve and supplying at the same time hydrogen to the anode such that the internal pressure of the anode becomes a predetermined maximum allowable pressure.

The hydrogen supply method may further include (g) when it is determined in the step (e) that the internal pressure of the anode is less than the predetermined abnormal pressure, determining whether a cross-over time period, for which residual gases residing in the fuel cell stack cross over through a polymer electrolyte membrane and the anode and the cathode is in pressure equilibrium after the fuel cell system is stopped, is not less than the stop time period, (h) when it is determined in the step (g) that the stop time period is less than the cross-over time period, estimating partial pressures of remaining gases, excluding the hydrogen, of the gases accommodated in the anode with reference to the internal pressure of the anode measured in the step (d), and (i) closing the purge valve and supplying at the same time an amount of the hydrogen corresponding to the partial pressures of the remaining gases estimated in the step (h) to the anode.

(i) may include (i1) setting a second target pressure of the anode with reference to a predetermined second target concentration of the hydrogen accommodated in the anode and the partial pressures of the remaining gases estimated in the step (h), and (i2) closing the purge valve and supplying at the same time the hydrogen to the anode such that the internal pressure of the anode becomes the second target pressure.

The hydrogen supply method may further include (j) when it is determined in the step (g) that the stop time period is the cross-over time period or more, determining whether a condensation time period consumed to complete condensation of vapor residing in the anode when the fuel cell system is stopped is the stop time period or more, (k) when it is determined in the step (j) that the stop time period is less than the condensation time period, estimating the partial pressures of the remaining gases, excluding the hydrogen, of the gases accommodated in the anode, and (l) closing the purge valve and supplying at the same time an amount of the hydrogen corresponding to the partial pressures of the remaining gases estimated in the step (k) to the anode.

The step (k) may include estimating the partial pressures of the remaining gases with reference to the internal pressure of the anode measured in the step (d).

The hydrogen supply method may further include (m) between the step (j) and the step (k), estimating an amount of the vapor accommodated in the anode, which has been condensed during the stop time period, and the step (k) may further include estimating the partial pressures of the remaining gases with reference to the internal pressure of the anode measured in the step (d) and the amount of the condensed vapor estimated in the step (m).

The step (m) may include estimating the amount of the condensed vapor with reference to the internal pressure of the anode.

The step (l) may include (l1) setting a third target pressure of the anode with reference to a predetermined third target concentration of the hydrogen accommodated in the anode and the partial pressures of the remaining gases estimated in the step (k), and (l2) closing the purge valve and supplying at the same time the hydrogen to the anode such that the internal pressure of the anode becomes the third target pressure.

The hydrogen supply method may further include steps of (n) when it is determined in the step (j) that the stop time period is longer than the condensation time period, setting a fourth target pressure of the anode with reference to the internal pressure of the anode measured in the step (d), (o) determining whether the fourth target pressure exceeds a predetermined maximum allowable pressure, and (p) when it is determined in the step (o) that the fourth target pressure is not more than the maximum allowable pressure, closing the purge valve and supplying at the same time hydrogen to the anode such that the internal pressure of the anode becomes the fourth target pressure.

The fourth target pressure may be set such that a concentration of the hydrogen of the anode becomes a predetermined fourth target concentration.

The hydrogen supply method may further include (q) between the step (j) and the step (n), when it is determined in the step (j) that the stop time period is longer than the condensation time period, determining whether the condensation of the vapor is completed. When it is determined in the step (q) that the condensation of the vapor is completed, the step (n) may be performed, and when it is determined in the step (q) that the condensation of the vapor is being performed, the step (k) may be performed.

The step (q) may include determining whether the internal pressure of the anode measured in the step (d) is a predetermined condensation end pressure or more.

The hydrogen supply method may further include, when it is determined in the step (o) that the fourth target pressure is less than the maximum allowable pressure, opening the purge valve and supplying at the same time hydrogen to the anode such that the internal pressure of the anode becomes the maximum allowable pressure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
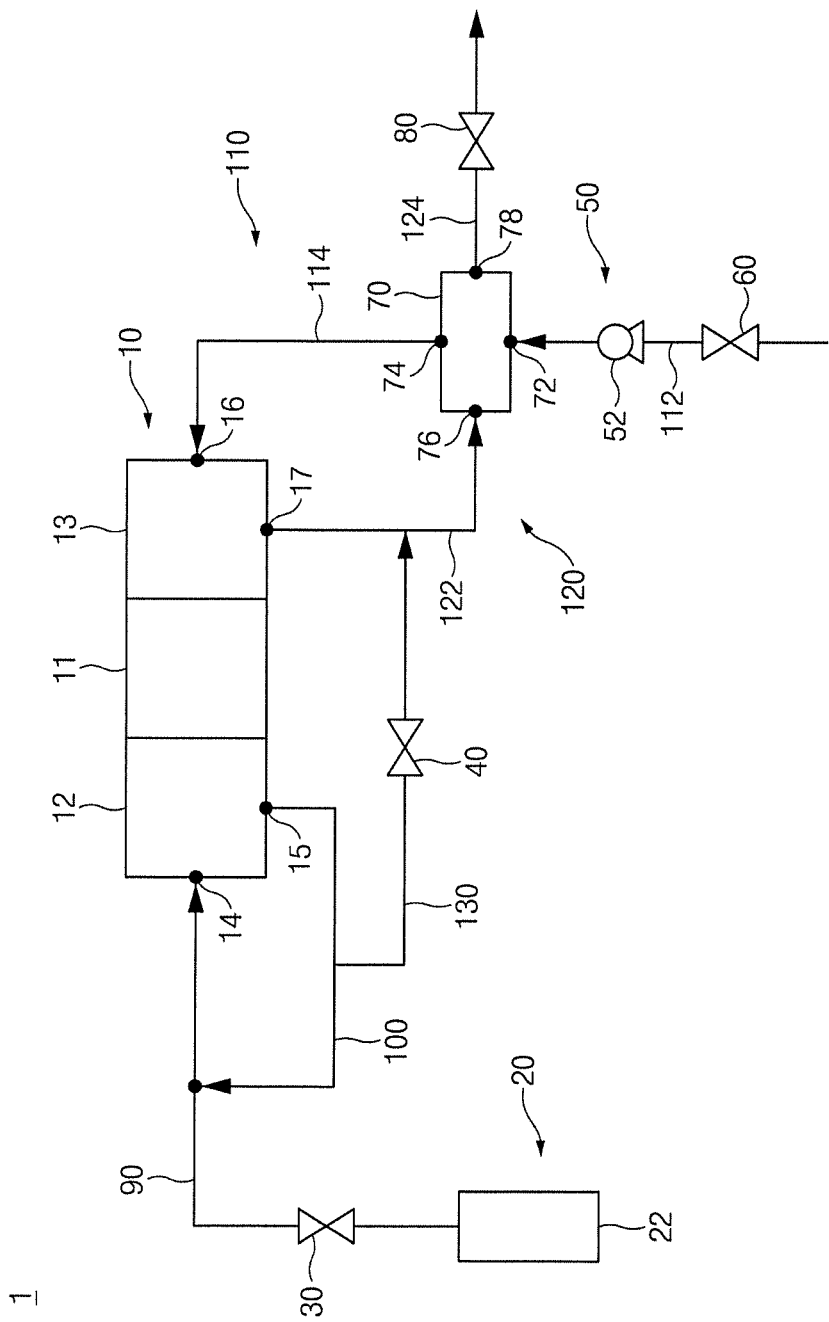
FIG. 1 is an illustrative view showing a schematic configuration of a fuel cell system.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The teLms defined in the generally used dictionaries should be construed as having the meanings that coincide with the meanings of the contexts of the related technologies, and should not be construed as ideal or excessively formal meanings unless clearly defined in the specification of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a illustrative view showing a schematic configuration of a fuel cell system.

The present disclosure relates to a hydrogen supply method for a fuel cell system, for supplying hydrogen to an anode according to a state of a fuel cell system when the fuel cell system is started. Hereinafter, a schematic configuration of a fuel cell system will be described with reference to FIG. 1.

The fuel cell system 1 may include a fuel cell stack 10 (hereinafter, 'a stack 10'), a hydrogen supply device 20, a hydrogen supply valve 30, a hydrogen purge valve 40, an air supply device 50, an air supply valve 60, a humidifier 70, and an air discharge valve 80.

First, the stack 10 may include a polymer electrolyte membrane 11, an anode 12 that generates hydrogen ions and electrons through an oxidation reaction of hydrogen, and a cathode 13 that generates electric energy and water through a reduction reaction, in which hydrogen ions and electrons that moved from the anode 12 and oxygen in air supplied by an air supply device 50 participate.

The anode 12 may include a hydrogen inlet 14 connected to a hydrogen supply line 90 and through which hydrogen that passed through the hydrogen supply line 90 is introduced, and a hydrogen outlet 15 connected to a hydrogen recirculation line 100 and through which the hydrogen that passed through the anode 12 is discharged. Here, the hydrogen recirculation line 100 connects the hydrogen outlet 15 and the hydrogen supply line 90 such that the hydrogen discharged from the anode 12 through the hydrogen outlet 15 is delivered to the hydrogen supply line 90 again. Accordingly, the hydrogen supplied from the hydrogen supply device 20 and the hydrogen recirculated through the hydrogen recirculation line 100 may be introduced together through the hydrogen inlet 14.

The cathode 13 may include an air inlet 16 connected to an air supply line 110 and through which air is introduced, and a humid air outlet 17 connected to a humid air discharge line 120 and through which humid air, in which the air that passed through the cathode 13 and the water generated in the cathode 13 are mixed, is discharged. Here, the air supply line 110 may include a first air supply line 112 communicating the atmospheric air and an air inlet 72 of the humidifier 70, and a second air supply line 114 communicating an air outlet 74 of the humidifier 70 and the air inlet 16 of the cathode 13. Further, the humid air discharge line 120 may include a first humid air discharge line 122 communicating the humid air outlet 17 of the cathode 13 and a humid air inlet 76 of the humidifier 70, and a second humid air discharge line 124 communicating a humid air outlet 78 of the humidifier 70 and the outside. Accordingly, the air that passed through the second air supply line 114 after being humidified in the humidifier 70 may be introduced through the air inlet 16, and the humid air may be discharged to the first humid air discharge line 122 through the humid air outlet 17.

Next, the hydrogen supply device 20 may include a hydrogen storage tank 22 in which hydrogen is stored. The hydrogen storage tank 22 is connected to the hydrogen inlet 14 of the anode 12 through the hydrogen supply line 90, and supplies hydrogen that is necessary for generating electricity in the stack 10. The hydrogen supplied from the hydrogen storage tank is introduced into the hydrogen inlet 14 of the anode 12 while flowing along the hydrogen supply line 90.

Next, the hydrogen supply valve 30 is installed in the hydrogen supply line 90 and may adjust the amount of hydrogen supplied to the anode 12 through adjustment of an opening degree of the hydrogen supply valve 30.

Next, the hydrogen purge valve 40 is configured to discharge hydrogen passing through the hydrogen recirculation line 100 to the outside. To solve this, the hydrogen recirculation line 100 is connected to the humid air discharge line 120 by the hydrogen purge line 130, and the hydrogen purge valve 40 is installed in the hydrogen purge line 130 to open and close the hydrogen purge line 130. The hydrogen purge valve 40 may selectively open the hydrogen purge line 130 when a predetermined hydrogen purge condition is satisfied. The hydrogen purge condition is not specifically limited. For example, the hydrogen purge condition may be a condition of whether the concentration of hydrogen in the anode 12 is a predetermined reference concentration or less. When the hydrogen purge line 130 is opened by the hydrogen purge valve 40, the hydrogen passing through the hydrogen recirculation line 100 and other gases may be discharged to the outside along the humid air discharge line 120 after being delivered to the humid air discharge line 120 through the hydrogen purge line 130.

Next, the air supply device 50 may include an air compressor 52 installed in the first air supply line 112 and configured to pump and supply atmospheric air. The air supplied by the air compressor 52 may be introduced into the air inlet 16 of the cathode 13 while flowing along the second air supply line 114, after being humidified by the humidifier 70 while flowing along the first air supply line 112.

Next, the air supply valve 60 is installed in the first air supply line 112, and may adjust the amount of air supplied to the cathode 13 through adjustment of an opening degree of the air supply valve 30.

Next, the humidifier 70 may be a hollow fiber humidifier 70 that may humidify air by exchanging moisture between the air supplied by the air compressor 52 and the humid air discharged from the cathode 13. The humidifier 70 may include an air inlet 72 connected to the first air supply line 112, an air outlet 74 connected to the second air supply line 114, a humid air inlet 76 connected to the first humid air discharge line 122, and a humid air outlet 78 connected to the second humid air discharge line 124. After exchanging moisture between the air introduced through the air inlet 72 and the humid air introduced through the humid air inlet 76 and humidifying the air, the humidifier 70 discharges the air through the air outlet 74 and discharges the humid air through the humid air outlet 78.

Next, the air discharge valve 80 is installed in the second humid air discharge line 124, and may adjust the emissions of the humid air discharged from the humid air outlet 17 and the hydrogen and other gases delivered from the hydrogen purge line 130 through adjustment of the opening degree of the air discharge valve 80.

Figure 2:
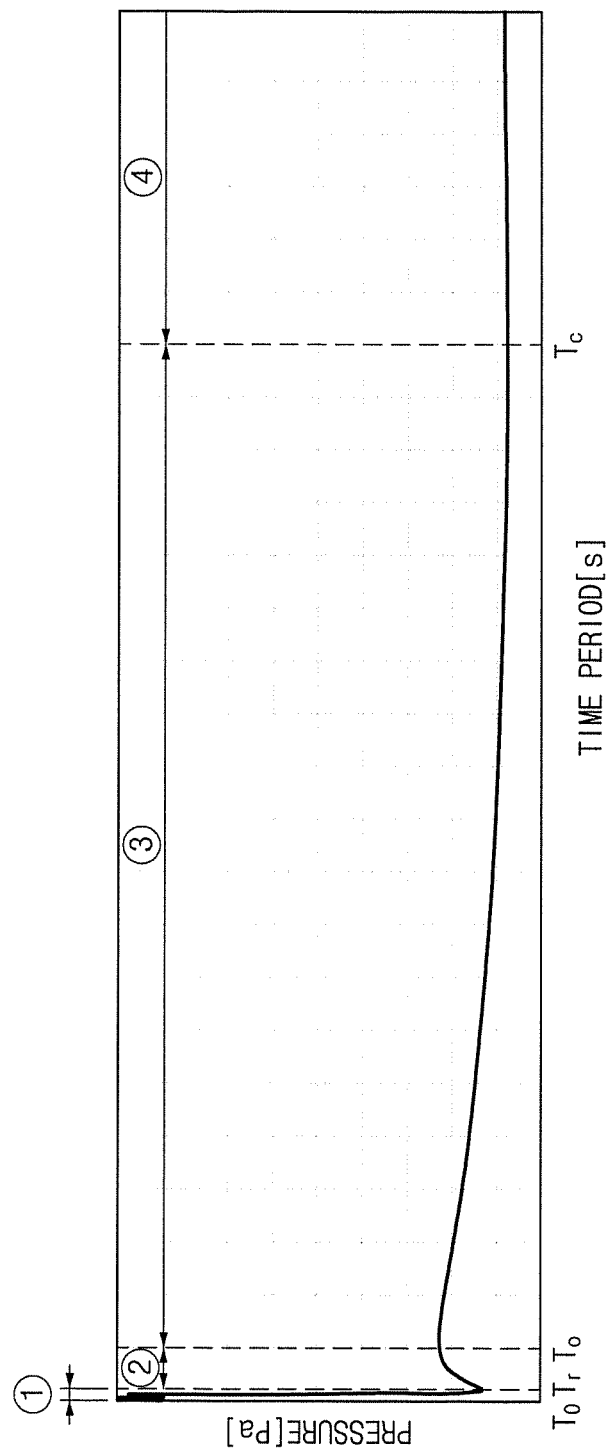
FIG. 2 is a graph depicting an aspect of a change of an internal pressure of an anode after the fuel cell system is stopped.
Figure 3:
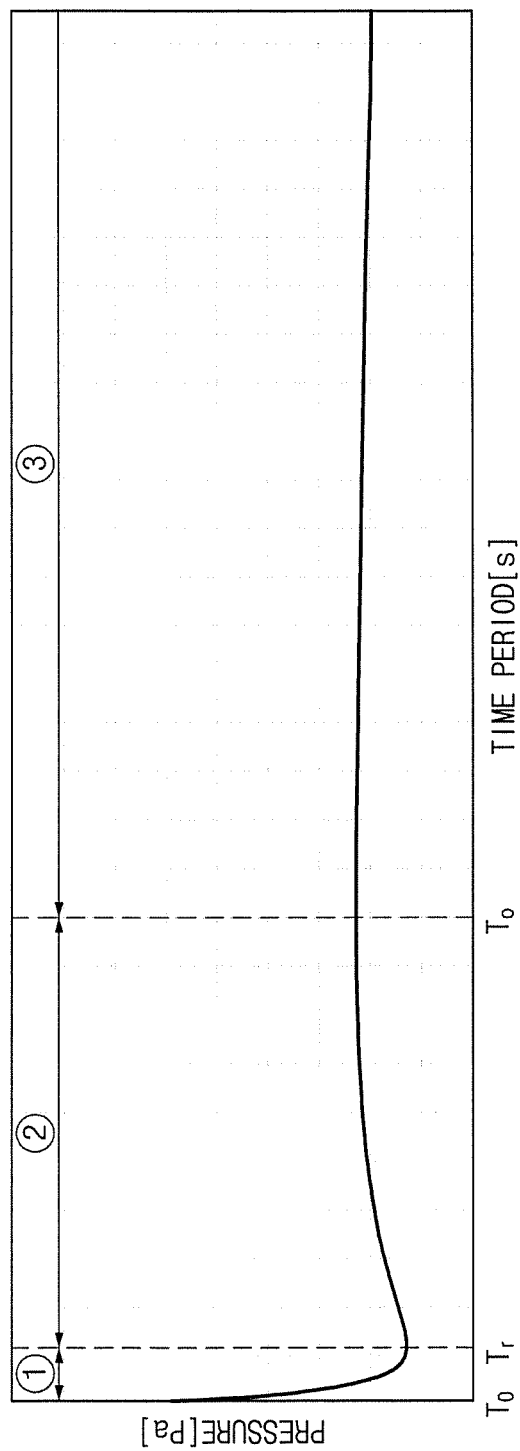
FIG. 3 is a graph depicting first to third sections of the graph of FIG. 2.

FIG. 2 is a graph depicting an aspect of a change of an internal pressure of an anode after the fuel cell system is stopped. FIG. 3 is a graph depicting first to third sections of the graph of FIG. 2. Here, FIG. 2 is a view depicting an aspect of a change of an internal pressure $p_a$ of the anode 12 when a relatively long time elapses after the fuel cell system is stopped. Further, FIG. 3 is a view depicting an aspect of a change of an internal pressure $p_a$ of the anode 12 when a relatively short time elapses after the fuel cell system is stopped.

When the fuel cell system 1 is stopped, the internal pressure of the anode 12 and the composition of the gases accommodated in the interior of the anode 12 change according to a total stop time period $T_s$ that elapses after the fuel cell system 1 is stopped. Accordingly, as illustrated in FIG. 2, the stop time period $T_s$ may be classified into first to fourth sections ① to ④ according to the internal pressure $p_a$ of the stack 10 and the composition of the gases accommodated in the interior of the stack 10.

For example, as illustrated in FIG. 3, the first section ① may be a section of the total stop time period $T_s$ of the fuel cell system 1 between a start time point $T_0$ at which the fuel cell system 1 is stopped and an end time point of a predetemined reaction time period $T_r$. The reaction time period $T_r$ refers to a time period that is consumed to complete a reaction of hydrogen residing in the anode 12 and oxygen residing in the cathode 13 (hereinafter, referred to as 'a reaction of residual hydrogen and residual oxygen') after the fuel cell system 1 is stopped.

The reaction of the residual hydrogen and the residual oxygen is completed in a relatively short time. Accordingly, when the reaction of the residual hydrogen and the residual oxygen progresses, there rarely occur phenomena, such as cross-over of the gases through the polymer electrolyte membrane 11, condensation of vapor, and introduction of exterior air through the valves 60 and 80 and other members.

However, all the residual hydrogen is exhausted by the reaction of the residual hydrogen and the residual oxygen and the residual oxygen is left, the residual oxygen may damage the stack 10. To achieve this, in general, the amount of the residual hydrogen and the residual oxygen that are left in the stack when the fuel cell system is stopped are adjusted such that all the residual oxygen is exhausted and only the residual hydrogen is left due to the reaction of the residual hydrogen and the residual oxygen.

As illustrated in FIG. 3, because the reaction of the residual hydrogen and the residual oxygen is dominant in the first section ①, the internal pressures $p_a$ of the anode 12 and the cathode 13 rapidly decrease. If the first section 1 is ended, a portion of the residual hydrogen, vapor, and the like are accommodated in the anode 12 and nitrogen and other gases residing when the fuel cell system 1 is stopped while all the residual oxygen is exhausted are accommodated in the cathode 13. Accordingly, when the first section ① is ended, the internal pressure $p_a$ of the anode 12 is the lowest in the total stop time period $T_s$ of the fuel cell system 1.

For example, as illustrated in FIG. 3, the second section ② may be a section of the total stop time period $T_s$ of the fuel cell system 1 between an end time point of the above-described reaction time period $T_r$ and an end time point of a predetermined cross-over time period $T_o$. The cross-over time period $T_o$ refers to a time period that is consumed to balance the pressures of the anode 12 and the cathode 13 by introducing the hydrogen residing in the anode 12 while not reacting with oxygen into the cathode 13 through the polymer electrolyte membrane 11 and introducing nitrogen and other gases residing in the cathode 13 when the fuel cell system 1 is stopped into the anode 12 through the polymer electrolyte membrane 11.

In general, the cross-over of hydrogen and nitrogen is completed before condensation of vapor and introduction of exterior air through the valves 60 and 80 and other members occur. Further, because the time period consumed for the cross-over of the hydrogen and the nitrogen is longer than a time period consumed for the residual hydrogen and the residual oxygen to react with each other, the cross-over of the hydrogen and the nitrogen rarely occurs in the first section ①. Accordingly, as illustrated in FIG. 3, because the cross-over of hydrogen and nitrogen is dominant in the second section ②, the internal pressure $p_a$ of the anode 12 gradually increases due to the nitrogen introduced from the cathode 13. Because the second section ② is relatively long as compared with the first section ①, the increase rate of the internal pressure $p_a$ of the anode 12 in the second section ② is relatively slow as compared with the decrease rate of the internal pressure $p_a$ of the anode 12 in the first section ①. If the second section ② is ended, hydrogen, nitrogen, and vapor are mainly accommodated in the interior of the anode 12.

For example, as illustrated in FIG. 3, the third section ③ may be a section of the total stop time period $T_s$ of the fuel cell system 1 between an end time point of the above-described cross-over time period $T_o$ and an end time point of a predetermined condensation period $T_c$. The condensation time period Tc refers to a time period that is consumed to condense the vapor accommodated in the anode 12.

In general, the vapor accommodated in the anode 12 starts to be condensed after the hydrogen and the nitrogen cross over each other. In this way, in the time period during which the vapor is condensed, a phenomenon in which exterior air is introduced into the stack 10 through the valves 60 and 80 and other members also may occur. However, the amount of the exterior air introduced into the stack 10 while the vapor is condensed is remarkably smaller than the amount of the condensed vapor $S_c$. Accordingly, as illustrated in FIG. 3, because the condensation of vapor is dominant in the third section ③, the internal pressure $p_a$ of the anode 12 gradually decreases according to the aspect of the condensation of the vapor. Because the third section ③ is relatively long as compared with the second section ②, the decrease rate of the internal pressure $p_a$ of the anode 12 in the third section ③ is relatively slow as compared with the increase rate of the internal pressure $p_a$ of the anode 12 in the second section ②. If the third section ③ is ended, hydrogen and nitrogen are mainly accommodated in the interior of the anode 12.

For example, as illustrated in FIG. 2, the fourth section ④ may be a section of the total stop time period $T_s$ of the fuel cell system 1 after the end time point of the predetermined condensation period $T_c$.

Generally, when the fuel cell system 1 is stopped, the air supply line 110 and the humid air discharge line 120 are closed by the air supply valve 60 and the air discharge valve 80, respectively. However, because there is a predetermined limit in the sealing performances of the air supply valve 60 and the air discharge valve 80, the exterior air that passed through the air supply valve 60 and the air discharge valve 80 while the fuel cell system 1 is stopped is introduced into the cathode 13 through the air supply line 110 and the air discharge line 120. Further, in this way, the nitrogen of the exterior air introduced into the cathode 13 is in turn introduced into the anode 12 through the polymer electrolyte membrane 11. The introduction phenomenon of the exterior air continuously occurs over the first to fourth sections ① to ④. However, because the reaction of the residual hydrogen and the residual oxygen, the cross-over of hydrogen and nitrogen, the condensation of vapor, and the like are dominant in the first to third sections ① to ③, the influence of the exterior air on the change of the internal pressure $p_a$ of the anode 12 and the change of the composition of the gases accommodated in the interior of the anode 12 is limited. Meanwhile, because the introduction of the exterior air is dominant in the fourth section ④, the internal pressure $p_a$ of the anode 12 gradually increases due to the nitrogen introduced from the outside through the valves 60 and 80. Accordingly, the internal pressure $p_a$ of the anode 12 in the fourth section ④ is higher than the internal pressure $p_a$ of the anode 12 in the third section ③, and the concentration $C_a$ of the hydrogen of the anode 12 in the fourth section ④ is lower than the concentration $C_a$ of the anode 12 in the third section ③.

Figure 4:
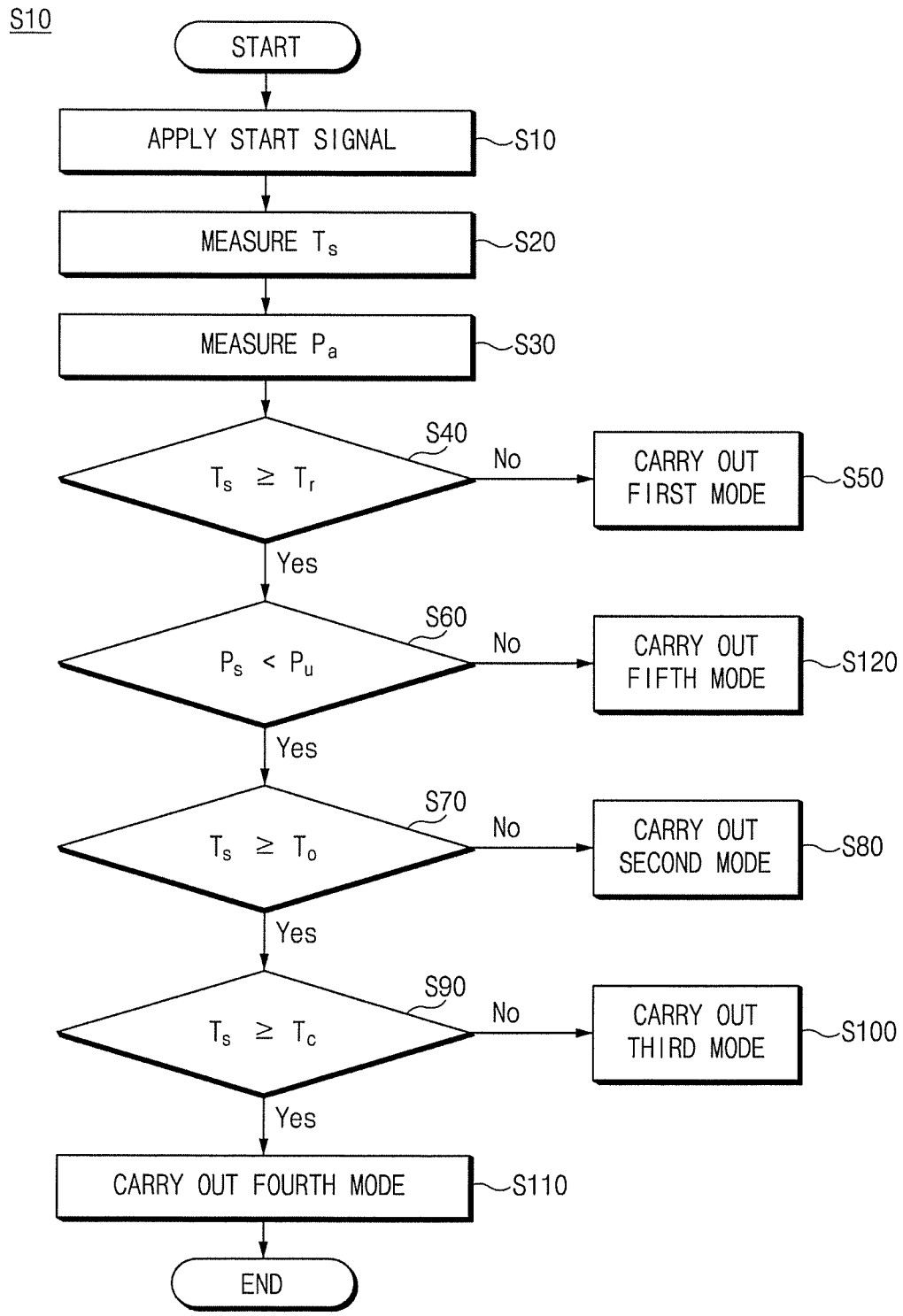
FIG. 4 is a flowchart illustrating a hydrogen supply method for a fuel cell system according to an embodiment of the present disclosure.

FIG. 4 is a flowchart illustrating a hydrogen supply method for a fuel cell system 1 according to an embodiment of the present disclosure;

The hydrogen supply method for a fuel cell system according to the embodiment of the present disclosure may include applying a start signal for starting the fuel cell system 1 (S10), measuring a stop time period $T_s$ that elapses until the fuel cell system 1 is started after the fuel cell system 1 is stopped (S20), measuring an internal pressure $p_a$ of an anode 12 (S30), determining whether a reaction time period $T_r$ consumed to complete a reaction of residual hydrogen and residual oxygen residing in a stack 10 after the fuel cell system 1 is stopped is the stop time period $T_s$ measured in operation S20 (S40), and when it is determined in operation S40 that the stop time period $T_s$ is less than the reaction time period $T_r$, supplying hydrogen to the anode 12 according to a predetermined first mode (S50).

First, in operation S10, it may be determined whether a start signal is applied to a fuel cell control unit of the fuel cell system 1. The start signal is not specifically limited. For example, the start signal may be a key-on signal, a brake pedal-off signal, an accelerator pedal-on signal, and the like.

Next, in operation S20, after a time period that elapses until a start signal is applied to the control unit after the fuel cell system 1 is stopped is measured, the measured time period may be set to a stop time period $T_s$.

Thereafter, in operation S30, the internal pressure $p_a$ of the anode 12 may be measured by using a pressure sensor (not illustrated) installed in the stack 10.

Next, in operation S40, the reaction time period $T_r$ stored in the control unit in advance and the stop time period $T_s$ measured in operation s20 may be compared.

Thereafter, in operation 50, when it is determined in operation S40 that the stop time period $T_s$ is less than the reaction time period $T_r$, hydrogen may be supplied to the anode 12 according to a first mode stored in the control unit in advance of the fuel cell system 1 in advance.

The method of carrying out the first mode is not specifically limited. For example, the first mode may be carried out by closing the purge valve 40 that may discharge the gases accommodated in the anode 12 from the anode 12 and supplying hydrogen to the anode 12 such that the internal pressure $p_a$ of the anode 12 becomes a predetermined first target pressure $P_1$.

The first target pressure $P_1$ may be set such that the concentration $C_a$ of the hydrogen of the anode 12 becomes a predetemined first target concentration through supply of hydrogen. It is preferable that the first target concentration be a concentration that may optimally maintain the performance of the fuel cell system 1. For example, the first target concentration may be 70%.

Because the first mode is carried out when the stop time period $T_s$ is less than the reaction time period $T_r$, the internal pressure $p_a$ of the anode 12 and the composition of the gases accommodated in the interior of the anode 12 in the first mode are the same as the internal pressure $p_a$ of the anode 12 and the composition of the gases accommodated in the interior of the anode 12 in the first section ①. Accordingly, when the first mode is carried out, hydrogen and vapor are mainly accommodated in the interior of the anode 12. Then, the amount of the hydrogen accommodated in the anode 12 changes according to an aspect of the reaction of the hydrogen and the oxygen generated after the fuel cell system 1 is stopped. Accordingly, the amount of the hydrogen accommodated in the anode 12 changes according to the stop time period $T_s$, and decreases as the stop time period $T_s$ and the reaction time period $T_r$ become closer.

Because the cross-over of hydrogen and nitrogen and the introduction of the exterior air rarely occur when the first mode is carried out, only the exhaustion phenomenon of the hydrogen due to the reaction of hydrogen and oxygen is dominant in the interior of the anode 12. Accordingly, even though hydrogen is supplied to the anode 12 while the purge valve 40 is closed, the possibility of the internal pressure $p_a$ of the anode 12 exceeding a predetermined maximum allowable pressure $P_{max}$ of the anode 12 is low while the first mode is carried out. Accordingly, the first mode may be carried out in a state in which the purge valve 40 is closed.

In this regard, while the purge valve 40 is closed, the control unit estimates the amount of hydrogen lost due to the reaction of the hydrogen and the oxygen generated after the fuel cell system 1 is stopped and the concentration $C_a$ of the hydrogen of the anode 12 with reference to the internal pressure $p_a$ of the anode 12 measured in operation S20. Further, after setting a first target pressure $P_1$ with reference to the amount of the lost hydrogen and the concentration of the hydrogen of the anode 12, which have been estimated in this way, the control unit may increase the concentration $C_a$ of the hydrogen of the anode 12 up to the first target concentration by supplying hydrogen to the anode 12 such that the internal pressure $p_a$ of the anode 12 becomes the first target pressure $P_1$.

Figure 5:
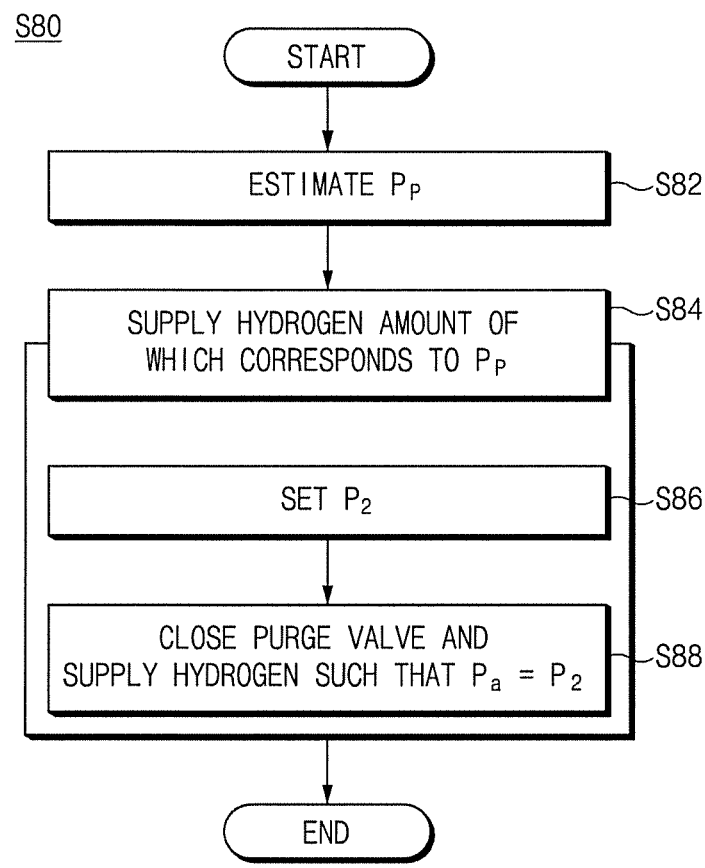
FIG. 5 is a flowchart illustrating a second mode of FIG. 4.

FIG. 5 is a flowchart illustrating a second mode of FIG. 4.

Meanwhile, the hydrogen supply method for a fuel cell vehicle may further include when it is determined in operation S40 that the stop time period $T_s$ is the reaction time period $T_r$ or more, determining whether the internal pressure $p_a$ of the anode 12 measured in operation S20 is a predetermined unusual pressure $P_u$ or higher (S60), when it is determined in operation S60 that the internal pressure $p_a$ of the anode 12 is less than an unusual pressure $P_u$, determining a cross-over time period $T_o$ consumed for residual gases residing in the stack 10 to cross over through a polymer electrolyte membrane 11 such that the pressures of the anode 12 and the cathode 13 are in an equilibrium state after the fuel cell system 1 is stopped is not less than the stop time period $T_s$ measured in operation S20 (S70), and when it is determined in operation S70 that the stop time period $T_s$ is less than the cross-over time period $T_o$, carrying out a predetermined second mode (S80).

First, in operation S60, the internal pressure $p_a$ of the anode 12 measured in operation S30 and the unusual pressure $P_u$ stored in the control unit in advance may be compared. The unusual pressure $P_u$ refers to a reference pressure for determining whether the air supply valve 60 and the air discharge valve 80 are normally sealed. When the internal pressure $p_a$ of the anode 12 measured in operation S30 is less than the unusual pressure $P_u$, it may be determined that the sealing performances of the air supply valve 60 and the air discharge valve 80 are normal.

Next, in operation S70, when it is determined in operation S60 that the internal pressure $p_a$ of the anode 12 is less than the unusual pressure $P_u$, the stop time period $T_s$ measured in operation S20 and the cross-over time period $T_o$ stored in the control unit in advance may be compared.

Thereafter, in operation S80, when it is determined in operation S70 that the stop time period $T_s$ is less than the cross-over time period $T_o$, the second mode stored in the control unit in advance may be carried out.

Because the second mode is carried out when the stop time period $T_s$ is not less than the reaction time period $T_r$ and less than the cross-over time period $T_o$, the internal pressure $p_a$ of the anode 12 and the composition of the gases accommodated in the interior of the anode 12 in the second mode are the same as the internal pressure $p_a$ of the anode 12 in the second section ② and the composition of the gases accommodated in the interior of the anode 12. Accordingly, when the second mode is carried out, hydrogen, vapor, and nitrogen are mainly accommodated in the interior of the anode 12.

Because the second mode is carried out while the cross-over of the hydrogen and nitrogen is dominantly performed in the interior of the stack 10, the amount of the nitrogen accommodated in the interior of the anode 12 becomes larger as the stop time period $T_s$ becomes closer to the cross-over time period $T_o$ and the concentration $C_a$ of the hydrogen of the anode 12 becomes lower as the stop time period $T_s$ becomes closer to the cross-over time period $T_o$. Accordingly, as the stop time period $T_s$ becomes closer to the cross-over time period $T_o$, it may be estimated that the partial pressures $P_p$ of the remaining gases of the accommodated gases of the anode 12 except for hydrogen becomes higher and the concentration of the hydrogen of the anode 12 becomes lower at the same time. While the cross-over of the hydrogen and the nitrogen is performed, the internal pressure $p_a$ of the anode 12 changes according to a progress degree of the cross-over of the hydrogen and the nitrogen. In this regard, in the second mode, after the partial pressures $P_p$ of the remaining gases of the gases accommodated in the anode 12, except for hydrogen, are estimated with reference to the internal pressure $p_a$ of the anode 12 measured in operation S30, hydrogen may be supplied to the anode 12 such that the concentration $C_a$ of the anode 12 becomes a concentration that is suitable for maintaining the performance of the fuel cell system 1.

For example, operation S80 may include an operation of estimating the partial pressures $P_p$ of the remaining gases of the gases accommodated in the anode 12, except for hydrogen, with reference to the internal pressure $p_a$ of the anode 12 measured in operation S30 (S82), and closing the purge valve 40 and supplying hydrogen, the amount of which corresponds to the partial pressures $P_p$ of the remaining gases estimated in operation S82, to the anode 12 at the same time (S84).

In operation S82, as represented in Equation 1, the concentrations of the remaining gases of the gases accommodated in the anode 12, except for hydrogen, may be estimated by using the internal pressure $p_a$ of the anode 12 measured in operation S30 and the concentration $C_a$ of the hydrogen of the anode 12. The concentration $C_a$ of the anode 12 may be estimated by using the amounts of hydrogen and air residing in the anode 12 and the cathode 13 when the fuel cell system 1 is stopped, the stop time period $T_s$, and the speed of the cross-over of the hydrogen and nitrogen.

$$P_p = P_a - 0.01 C_a [Pa] \quad \text{[Equation 1]}$$

Operation S84 may include an operation of setting a second target pressure $P_2$ of the anode 12 with reference to a predetermined second target concentration of the hydrogen accommodated in the anode 12 and the partial pressures Pp of the remaining gases estimated in operation S82 (S86), and an operation of closing the purge valve 40 and supplying hydrogen to the anode 12 such that the internal pressure $p_a$ of the anode 12 becomes the second target pressure $P_2$ set in operation S86 (S88).

In operation S86, as represented in Equation 2, a second target pressure $P_2$ of the anode 12 may be set by using the partial pressure $P_p$ of the remaining gases estimated in operation s82 and the second target concentration stored in the control unit in advance. It is preferable that the second target concentration be a concentration of hydrogen that may optimally maintain the performance of the fuel cell system 1. For example, the second target concentration may be 70%.

$$P_2 = \frac{P_p}{1 - 0.01 C_2} [Pa] \quad \text{[Equation 2]}$$

In operation S88, the purge valve 40 may be closed and hydrogen may be supplied to the anode 12 such that the internal pressure $p_a$ of the anode 12 becomes the second target pressure $P_2$ set in operation S86. Because the exterior air is rarely introduced into the stack 10 through the valves 60 and 80 and other members when the second mode is carried out, the possibility of the internal pressure $p_a$ of the anode 12 exceeding the maximum allowable pressure Pmax of the anode 12 even though hydrogen is supplied to the anode 12 while the purge valve 40 is closed is low. Accordingly, operation S88 may be performed in a state in which the purge valve 40 is closed. According to operation S88, the internal pressure $p_a$ of the anode 12 may be a second target pressure $P_2$ that is less than the maximum allowable pressure, and the concentration of the hydrogen of the anode 12 may be a second target concentration that may optimally maintain the performance of the fuel cell system 1.

Figure 6:
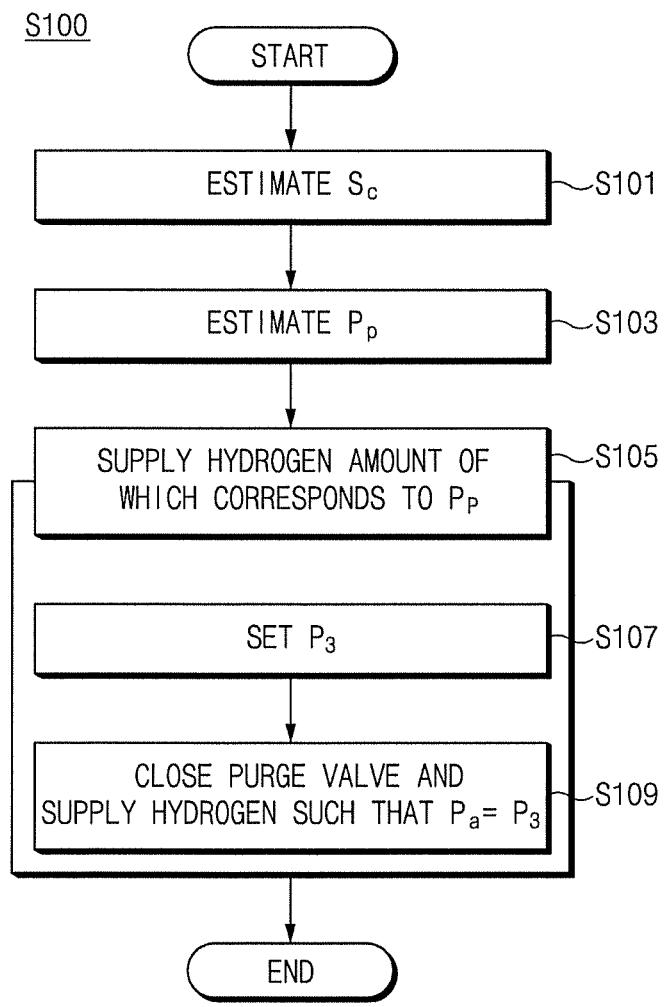
FIG. 6 is a flowchart illustrating a third mode of FIG. 4.

FIG. 6 is a flowchart illustrating a third mode of FIG. 4.

Meanwhile, the hydrogen supply method for a fuel cell system may further include an operation of, when it is determined in operation S70 that the stop time period $T_s$ is not less than the cross-over time period $T_o$, determining whether the concentration time period Tc that is necessary to complete the condensation of vapor accommodated in the anode 12 is not less than the stop time period $T_s$ measured in operation S20 (S90), and, when it is determined in operation S70 that the stop time period $T_s$ is less than the cross-over time period $T_o$, carrying out a predetermined third mode (S100).

First, in operation S90, when it is determined in operation S70 that the stop time period $T_s$ is not less than the cross-over time period $T_o$, the stop time period $T_s$ measured in operation S20 and the condensation time period Tc stored in the control unit in advance may be compared.

Thereafter, in operation S100, when it is determined in operation S90 that the stop time period $T_s$ is less than the condensation time period $T_o$, the third mode stored in the control unit in advance may be carried out.

Because the third mode is carried out when the stop time period $T_s$ is not less than the cross-over time period $T_o$ and less than the condensation time period $T_c$, the internal pressure $p_a$ of the anode 12 and the composition of the gases accommodated in the interior of the anode 12 in the third mode are the same as the internal pressure $p_a$ of the anode 12 in the third section and the composition of the gases accommodated in the interior of the anode 12.

Because the third mode is carried out while the condensation of vapor is dominant in the interior of the stack 10, the amount of nitrogen accommodated in the interior of the anode 12 is maintained and the amount of vapor accommodated in the interior of the anode 12 becomes smaller as the stop time period $T_s$ becomes closer to the condensation time period $T_c$. Accordingly, as the stop time period $T_s$ becomes closer to the condensation time period $T_c$, it may be estimated that the partial pressures $P_p$ of the remaining gases of the accommodated gases of the anode 12 except for hydrogen becomes lower and the concentration of the hydrogen of the anode 12 becomes higher at the same time. In this way, when the condensation of the vapor progresses, the internal pressure $p_a$ of the anode 12 changes according to the progress degree of the condensation of the vapor. In this regard, in the third mode, after the internal pressure $p_a$ of the anode 12 measured in operation S30 and the amount $S_c$ of the vapor condensed during the stop time period $T_s$, which was measured in operation S20, hydrogen may be supplied to the anode 12 such that the concentration $C_a$ of the anode 12 becomes a concentration that is suitable for maintaining the performance of the fuel cell system 1.

For example, operation S100 may include an operation of estimating the amount $S_c$ of the vapor condensed during the stop time period $T_s$, which was measured in operation S20 (S101), an operation of estimating the partial pressures $P_p$ of the remaining gases of the gases accommodated in the anode 12, except for the hydrogen, with reference to the internal pressure $p_a$ of the anode 12 measured in operation S30 and the amount $S_c$ of the condensed vapor estimated in operation S101 (S103), and an operation of supplying hydrogen, the amount of which corresponds to the partial pressures $P_p$ of the remaining gases, which were estimated in operation S103 (S105).

In operation S101, the amount $S_c$ of the condensed vapor may be estimated with reference to the internal temperature of the anode 12 measured by the temperature sensor (not illustrated) installed in the stack 10. In general, as the amount $S_c$ of the vapor increases as the atmospheric pressure becomes lower, the amount $S_c$ of the condensed vapor may be estimated with reference to the internal temperature of the anode 12.

In operation S103, as represented in Equation 3, the partial pressures $P_p$ of the remaining gases of the gases accommodated in the anode 12, except for hydrogen, may be estimated by using the internal pressure $p_a$ of the anode 12 measured in operation S30 and the concentration $C_a$ of the hydrogen of the anode 12. The concentration $C_a$ of the anode 12 may be estimated by using the amounts of hydrogen and air residing in the anode 12 and the cathode 13 when the fuel cell system 1 is stopped, the stop time period $T_s$, and the amount $S_c$ of the condensed vapor estimated in operation S101.

$$P_p = P_a - 0.01 C_a [Pa] \quad \text{[Equation 3]}$$

Operation S105 may include an operation of setting a third target pressure $P_3$ of the anode 12 with reference to a predetermined third target concentration of the hydrogen accommodated in the anode 12 and the partial pressures $P_p$ of the remaining gases estimated in operation S103 (S107), and an operation of closing the purge valve 40 and supplying hydrogen to the anode 12 such that the internal pressure $p_a$ of the anode 12 becomes the third target pressure $P_3$ set in operation S107 (S109).

In operation S107, as represented in Equation 4, a third target pressure $P_3$ of the anode 12 may be set by using the partial pressure $P_p$ of the remaining gases estimated in operation S103 and the third target concentration stored in the control unit in advance. It is preferable that the third target concentration be a concentration of hydrogen that may optimally maintain the performance of the fuel cell system 1. For example, the third target concentration may be 70%.

$$P_3 = \frac{P_p}{1 - 0.01 C_3} [Pa] \quad \text{[Equation 4]}$$

In operation S109, the purge valve 40 may be closed and hydrogen may be supplied to the anode 12 such that the internal pressure $p_a$ of the anode 12 becomes the third target pressure $P_3$ set in operation S107. Because the exterior air is rarely introduced into the stack 10 through the valves 60 and 80 and other members when the third mode is carried out, the possibility of the internal pressure $p_a$ of the anode 12 exceeding the maximum allowable pressure $P_{max}$ of the anode 12 even though hydrogen is supplied to the anode 12 while the purge valve 40 is closed is low. Accordingly, operation S109 may be performed in a state in which the purge valve 40 is closed. According to operation S109, the internal pressure $p_a$ of the anode 12 may be a third target pressure $P_3$ that is less than the maximum allowable pressure, and the concentration of the hydrogen of the anode 12 may be a third target concentration that may optimally maintain the performance of the fuel cell system 1.

Figure 7:
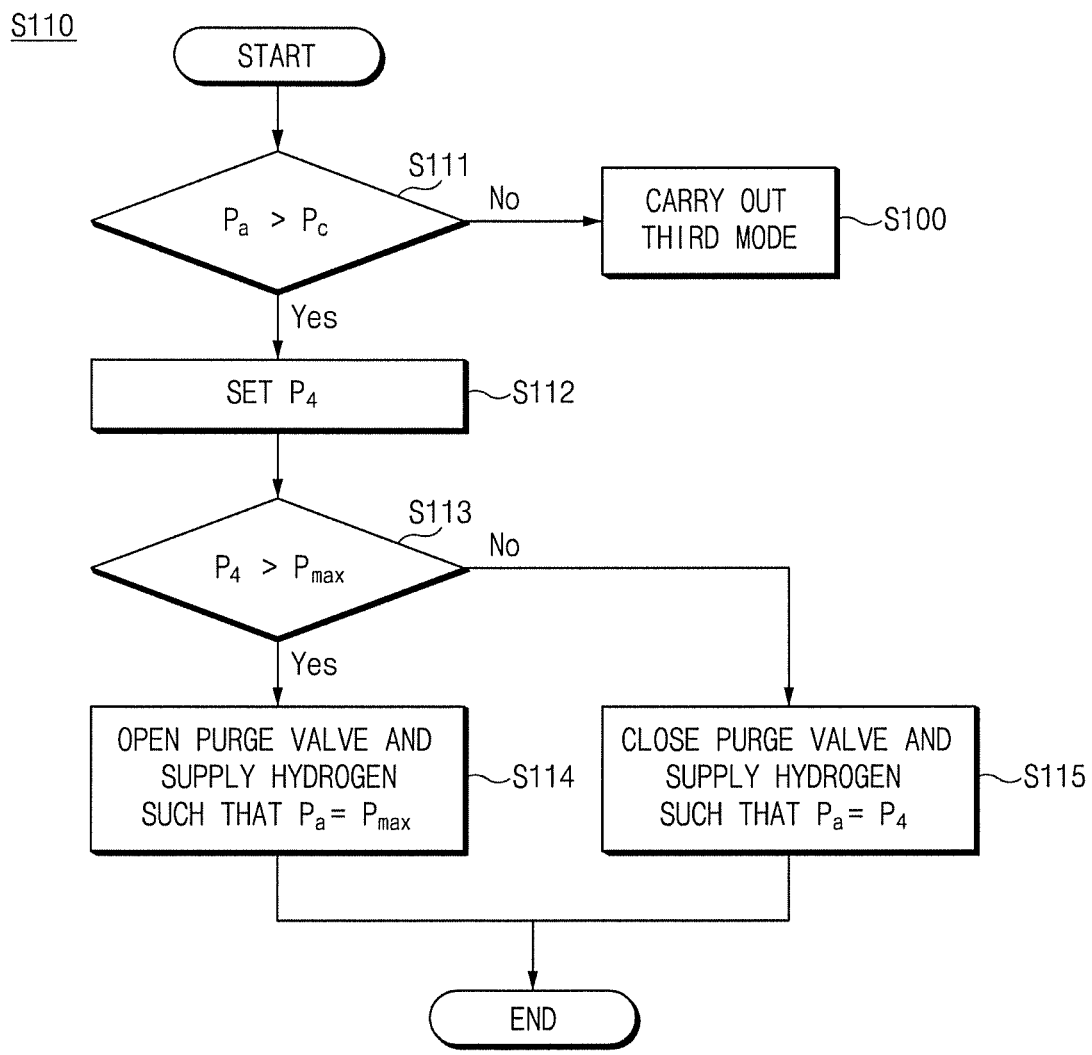
FIG. 7 is a flowchart illustrating a fourth mode of FIG. 4.

FIG. 7 is a flowchart illustrating a fourth mode of FIG. 4.

Meanwhile, the hydrogen supply method for a fuel cell system may further include an operation of, when it is determined in operation S90 that the stop time period $T_s$ is not less than the condensation time period $T_c$, carrying out a predetermined fourth mode (S110).

Because the fourth mode is carried out when the stop time period $T_s$ is not less than the condensation time period $T_c$, the internal pressure $p_a$ of the anode 12 and the composition of the gases accommodated in the interior of the anode 12 in the fourth mode are the same as the internal pressure $p_a$ of the anode 12 in the fourth section ④ and the composition of the gases accommodated in the interior of the anode 12.

Because the fourth mode is carried out while introduction of exterior air through the valves 60 and 80 and other members is dominant, the internal pressure $p_a$ of the anode 12 increases as the stop time period $T_s$ becomes longer and the concentration $C_a$ of the anode 12 decreases as the stop time period $T_s$ becomes longer. In this regard, the fourth mode may be carried out by adjusting opening/closing of the purge valve 40 and the amount of the hydrogen supplied to the anode 12 according to an increase degree of the internal pressure $p_a$ of the anode due to the introduction of the exterior air.

For example, operation S110 may include an operation of determining whether the condensation of vapor is completed (S111), when it is determined in operation S111 that the condensation of the vapor is completed, setting a fourth target pressure $P_4$ with reference to the internal pressure $p_a$ estimated in operation S30 (S112), an operation of determining whether the fourth target pressure $P_4$ set in operation S112 exceeds the maximum allowable pressure $P_{max}$ of the anode 12 (S113), when it is determined in operation S112 that the fourth target pressure $P_4$ is not more than the maximum allowable pressure $P_{max}$, closing the purge valve 40 and supplying hydrogen to the anode 12 such that the internal pressure $p_a$ of the anode 12 becomes the fourth target pressure $P_4$, and when it is determined in operation S113 that the fourth target pressure $P_4$ is more than the maximum allowable pressure $P_{max}$, closing the purge valve 40 and supplying hydrogen to the anode 12 such that the internal pressure $p_a$ of the anode 12 becomes the maximum allowable pressure $P_{max}$ (S114).

In operation S111, it may be determined whether the internal pressure $p_a$ measured in operation S30 is not less than a predetermined condensation ending pressure $P_c$ of the anode 12. Here, the condensation ending pressure $P_c$ is an internal pressure $p_a$ of the anode 12 when the condensation of the vapor accommodated in the anode 12 is completed, and it is preferable that the condensation ending pressure $P_c$ be an internal pressure $p_a$ of the anode 12 when the third section ③ is completed.

Even though it is determined in operation S90 that the stop time period $T_s$ is not less than the condensation time period $T_c$, the condensation of the vapor in the anode 12 is dominant until the condensation of the vapor is completed when the condensation of the vapor is not completed yet. Accordingly, when it is determined in operation S111 that the internal pressure $p_a$ of the anode 12 is less than the condensation ending pressure $P_c$, an operation of carrying out the above-described third mode (S100) may be carried out by determining that the condensation of the vapor is not completed yet.

In operation S112, when it is determined in operation S111 that the internal pressure $p_a$ of the anode 12 is not less than the condensation ending pressure $P_c$, a fourth target pressure $P_4$ may be set with reference to the internal pressure $p_a$ of the anode 12 measured in operation S30. By using the internal pressure $p_a$ of the anode 12, the partial pressures $P_p$ of the remaining gases of the gases accommodated in the anode 12, except for the hydrogen, may be estimated. The fourth target pressure $P_4$ may be set with reference to the partial pressures $P_p$ of the remaining gases such that the concentration $C_a$ of the hydrogen of the anode 12 becomes a predetermined fourth target concentration through supply of the hydrogen to the anode 12. It is preferable that the fourth target concentration be a concentration of hydrogen that may optimally maintain the performance of the fuel cell system 4. For example, the fourth target concentration may be 70%.

In operation S113, the fourth target pressure $P_4$ of the anode 12 set in operation S112 may be compared with the maximum allowable pressure P of the anode 12.

In operation S114, hydrogen may be supplied to the anode 12 while the purge valve 40 is closed such that the internal pressure $p_a$ of the anode 12 becomes the fourth target pressure $P_4$ set in operation S112. When the fourth target pressure $P_4$ of the anode 12 is not more than the maximum allowable pressure $P_{max}$ of the anode 12, the durability of the anode 12 is not weakened even though the hydrogen is supplied to the anode 12 such that the concentration $C_a$ of the hydrogen of the anode 12 is high enough to optimally maintain the performance of the fuel cell system 1. Accordingly, operation S114 may be performed in a state in which the purge valve 40 is closed. According to operation S114, the internal pressure $p_a$ of the anode 12 may be a fourth target pressure $P_4$ that is less than the maximum allowable pressure $P_{max}$, and the concentration of the hydrogen of the anode 12 may be a fourth target concentration that may optimally maintain the performance of the fuel cell system 1.

In operation S115, hydrogen may be supplied to the anode 12 while the purge valve 40 is opened such that the internal pressure $p_a$ of the anode 12 becomes the maximum allowable pressure $P_{max}$. When the fourth target pressure $P_4$ of the anode 12 exceeds the maximum allowable pressure $P_{max}$ of the anode 12, the durability of the anode 12 may be weakened if the hydrogen is supplied to the anode 12 such that the internal pressure $p_a$ of the anode 12 becomes the fourth target pressure $P_4$. Accordingly, operation S114 may be performed in a state in which the internal pressure $p_a$ of the anode 12 increases to the maximum allowable pressure $P_{max}$ and the concentration $C_a$ of the hydrogen of the anode 12 increases maximally while the purge valve 40 is opened. According to operation S115, the internal pressure $p_a$ and the concentration $C_a$ of the hydrogen of the anode 12 may be optimally adjusted without hampering the durability of the anode 12.

Meanwhile, the hydrogen supply method for a fuel cell system may further include an operation of, when it is determined in operation S60 that the internal pressure $p_a$ of the anode 12 exceeds a predetermined unusual pressure $P_u$, opening the purge valve 40 and supplying hydrogen to the anode 12 such that the internal pressure $p_a$ of the anode 12 becomes the maximum allowable pressure $P_{max}$ (S120).

When it is determined in operation S60 that the internal pressure $p_a$ of the anode 12 is not less than the unusual pressure $P_u$, the sealing performance of at least one of the valves 60 and 80 may become abnormal so that there is a high possibility of the exterior air being rapidly introduced into the anode 12 through at least one of the valves 60 and 80. Accordingly, operation S120 may be performed in a state in which the internal pressure $p_a$ of the anode 12 increases to the maximum allowable pressure $P_{max}$ and the concentration $C_a$ of the hydrogen of the anode 12 increases maximally while the purge valve 40 is opened. According to operation S120, the internal pressure $p_a$ of the anode 12 and the concentration $C_a$ of the hydrogen of the anode 12 may be optimally adjusted without hampering the durability of the anode 12.

In the hydrogen supply method for a fuel cell system, because hydrogen is selectively purged only when the internal pressure of the anode 12 may exceed the maximum allowable pressure $P_{max}$ while hydrogen is supplied to the anode 12 when the fuel cell system 1 is started, a frequency of purging hydrogen when the fuel cell system 1 is started may be minimized. Through this, according to the hydrogen supply method for a fuel cell system, the amount of the hydrogen exhausted to the outside through purging of hydrogen when the fuel cell system 1 may be minimized is started, the pressure of the hydrogen supplied to the anode 12 when the fuel cell system 1 is started may be minimized, and the concentration of the hydrogen of the exhaust gases discharged to the outside when the fuel cell system 1 is started may be minimized.

The hydrogen supply method for a fuel cell system according to the present disclosure has the following effects.

First, according to the present disclosure, because hydrogen is selectively purged only when the internal pressure of the anode may exceed the maximum allowable pressure while hydrogen is supplied to the anode when the fuel cell system is started, a frequency of purging hydrogen when the fuel cell system is started may be minimized Second, the amount of the hydrogen exhausted to the outside through purging of hydrogen when the fuel cell system is started may be minimized.

Third, the pressure of the hydrogen supplied to the anode when the fuel cell system is started may be minimized.

Fourth, the concentration of the hydrogen of the exhaust gases discharged to the outside when the fuel cell system is started may be minimized.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A hydrogen supply method for a fuel cell system, for supplying hydrogen according to a state of the fuel cell system when the fuel cell system is started, the hydrogen supply method comprising steps of:
    (a) measuring a stop time period which elapses until the fuel cell system is started after the fuel cell system is stopped;
    (b) determining whether a reaction time period consumed to complete a reaction of residual hydrogen and residual oxygen residing in a fuel cell stack since the fuel system is stopped is not more than the stop time period;
    (c) when it is determined in the step (b) that the stop time period is less than the reaction time period, closing a purge valve that is able to discharge gases accommodated in an anode from the anode and supplying at the same time hydrogen to the anode such that an internal pressure of the anode becomes a predetermined first target pressure;
    (d) before the step (b), measuring the internal pressure of the anode;
    (e) determining whether the internal pressure of the anode measured in the step (d) is less than a predetermined abnormal pressure;
    (f) when it is determined in the step (e) that the internal pressure is not less than the predetermined abnormal pressure, opening the purge valve and supplying at the same time hydrogen to the anode such that the internal pressure of the anode becomes a predetermined maximum allowable pressure;
    (g) when it is determined in the step (e) that the internal pressure of the anode is less than the predetermined abnormal pressure, determining whether a cross-over time period, for which residual gases residing in the fuel cell stack cross over through a polymer electrolyte membrane and the anode and the cathode is in pressure equilibrium after the fuel cell system is stopped, is not less than the stop time period;
    (h) when it is determined in the step (g) that the stop time period is less than the cross-over time period, estimating partial pressures of remaining gases, excluding the hydrogen, of the gases accommodated in the anode with reference to the internal pressure of the anode measured in (d); and
    (i) closing the purge valve and supplying at the same time an amount of the hydrogen corresponding to the partial pressures of the remaining gases estimated in the step (h) to the anode.

2. The hydrogen supply method of claim 1, wherein the predetermined first target pressure is set such that a concentration of the hydrogen in the anode becomes a predetermined first target concentration.

3. The hydrogen supply method of claim 1, wherein the step (i) includes:
    (i1) setting a second target pressure of the anode with reference to a predetermined second target concentration of the hydrogen accommodated in the anode and the partial pressures of the remaining gases estimated in the step (h); and
    (i2) closing the purge valve and supplying at the same time the hydrogen to the anode such that the internal pressure of the anode becomes the second target pressure.

4. The hydrogen supply method of claim 3, further comprising:
    (j) when it is determined in the step (g) that the stop time period is the cross-over time period or more, determining whether a condensation time period, consumed to complete condensation of vapor residing in the anode when the fuel cell system is stopped, is the stop time period or more;
    (k) when it is determined in the step (j) that the stop time period is less than the condensation time period, estimating the partial pressures of the remaining gases, excluding the hydrogen, of the gases accommodated in the anode; and
    (l) closing the purge valve and supplying at the same time an amount of the hydrogen corresponding to the partial W pressures of the remaining gases estimated in the step (k) to the anode.

5. The hydrogen supply method of claim 4, wherein the step (k) includes:
    estimating the partial pressures of the remaining gases with reference to the internal pressure of the anode measured in the step (d).

6. The hydrogen supply method of claim 5, further comprising:
    (m) between the step (j) and the step (k}, estimating an amount of the vapor accommodated in the anode, which has been condensed during the stop time period,
    wherein the step (k) further includes:
    estimating the partial pressures of the remaining gases with reference to the internal pressure of the anode measured in the step (d) and the amount of the condensed vapor estimated in the step (m).

7. The hydrogen supply method of claim 6, wherein the step (m) includes:
   estimating the amount of the condensed vapor with reference to the internal pressure of the anode.

8. The hydrogen supply method of claim 4, wherein the step (l) includes:
   (l1) setting a third target pressure of the anode with reference to a predetermined third target concentration of the hydrogen accommodated in the anode and the partial pressures of the remaining gases estimated in the step (h); and
   (l2) closing the purge valve and supplying at the same time the hydrogen to the anode such that the internal pressure of the anode becomes the third target pressure.

9. The hydrogen supply method of claim 4, further comprising:
   (n) when it is determined in the step (j) that the stop time period is longer than the condensation time period, setting a fourth target pressure of the anode with reference to the internal pressure of the anode measured in the step (d);
   (o) determining whether the fourth target pressure exceeds a predetermined maximum allowable pressure; and
   (p) when it is determined in the step (o) that the fourth target pressure is not more than the maximum allowable pressure, closing the purge valve and supplying at the same time hydrogen to the anode such that the internal pressure of the anode becomes the fourth target pressure.

10. The hydrogen supply method of claim 9, wherein the fourth target pressure is set such that a concentration of the hydrogen of the anode becomes a predetermined fourth target concentration.

11. The hydrogen supply method of claim 9, further comprising:
   (q) between the step (j) and the step (n), when it is determined in the step (j) that the stop time period is longer than the condensation time period, determining whether the condensation of the vapor is completed,
   wherein when it is determined in the step {q) that the condensation of the vapor is completed, the step (n) is performed, and
   wherein when it is determined in the step (q) that the condensation of the vapor is being performed, the step (k) is performed.

12. The hydrogen supply method of claim 11, wherein the step (q) includes:
   determining whether the internal pressure of the anode measured in the step (d) is a predetermined condensation end pressure or more.

13. The hydrogen supply method of claim 9, further comprising:
   when it is determined in the step (o) that the fourth target pressure is less than the maximum allowable pressure, opening the purge valve and supplying at the same time hydrogen to the anode such that the internal pressure of the anode becomes the maximum allowable pressure.

* * * * *